United States Patent
Doi et al.

(10) Patent No.: US 7,841,963 B2
(45) Date of Patent: Nov. 30, 2010

(54) SHIFT CONTROL APPARATUS FOR AN AUTOMATIC TRANSMISSION

(75) Inventors: Hironori Doi, Nishio (JP); Nobuaki Inagaki, Nishio (JP); Yasuo Tukamoto, Obu (JP); Hiroshi Tutui, Nishio (JP)

(73) Assignee: Aisin AW Co., Ltd., Aichi-ken (JP)

( * ) Notice: Subject to any disclaimer, the term of this patent is extended or adjusted under 35 U.S.C. 154(b) by 640 days.

(21) Appl. No.: 11/882,185

(22) Filed: Jul. 31, 2007

(65) Prior Publication Data

US 2008/0064565 A1    Mar. 13, 2008

(30) Foreign Application Priority Data

Jul. 31, 2006    (JP) .............................. 2006-209087

(51) Int. Cl.
 *F16H 61/16*    (2006.01)

(52) U.S. Cl. ...................................... 477/125; 477/180

(58) Field of Classification Search ........................ None
See application file for complete search history.

(56) References Cited

U.S. PATENT DOCUMENTS 5,067,373 A * 11/1991 Kyohzuka et al. ............. 477/98
5,241,476 A * 8/1993 Benford et al. ................ 701/58
6,616,560 B2 * 9/2003 Hayabuchi et al. .......... 475/116

FOREIGN PATENT DOCUMENTS

| JP | 2-245571 A | 10/1990 |
|----|------------|---------|
| JP | 09-042442 A | 2/1997 |
| JP | 11-108178 A | 4/1999 |

* cited by examiner

*Primary Examiner*—David D Le
*Assistant Examiner*—Justin Holmes
(74) *Attorney, Agent, or Firm*—Sughrue Mion, PLLC

(57) ABSTRACT

A shift speed control that, in the case in which it is determined that reverse jump shifting, which returns to a previous shift speed, has occurred during jump shift control, a load amount determining means determines whether a load amount that is applied to friction engagement elements is within a permitted range. Based on the result of this determination, a multiple control permitting means permits execution of multiple shift control for the reverse jump shifting, and when permitted by the multiple control permitting means, the shift control means executes multiple shift control for reverse jump shifting. In addition, in the case in which the shift control means is not permitted by the multiple control permitting means, the shift control means executes reverse jump shift bypass control, and shifts to a shift speed to be shifted to after temporarily shifting to an intermediate shift speed.

6 Claims, 10 Drawing Sheets

FIG.2

|   | C1 | C2 | C3 | B1 | B2 | B3 | B4 | B5 | F1 | F2 |
|---|---|---|---|---|---|---|---|---|---|---|
| N |  |  |  |  |  |  |  | ○ |  |  |
| 1ST | ○ |  |  |  |  | △ |  | ○ |  | ○ |
| 2ND | ○ |  |  | △ | ○ |  |  | ○ | ○ |  |
| 3RD | ○ |  |  | △ | ○ |  | ○ |  | ○ |  |
| 4TH | ○ |  | ○ | △ | ○ |  |  |  | ○ |  |
| 5TH | ○ | ○ | ○ |  |  |  |  |  |  |  |
| REV |  | ○ |  |  |  | ○ |  | ○ |  |  |

○:ENGAGED  △:DURING ENGINE BRAKING

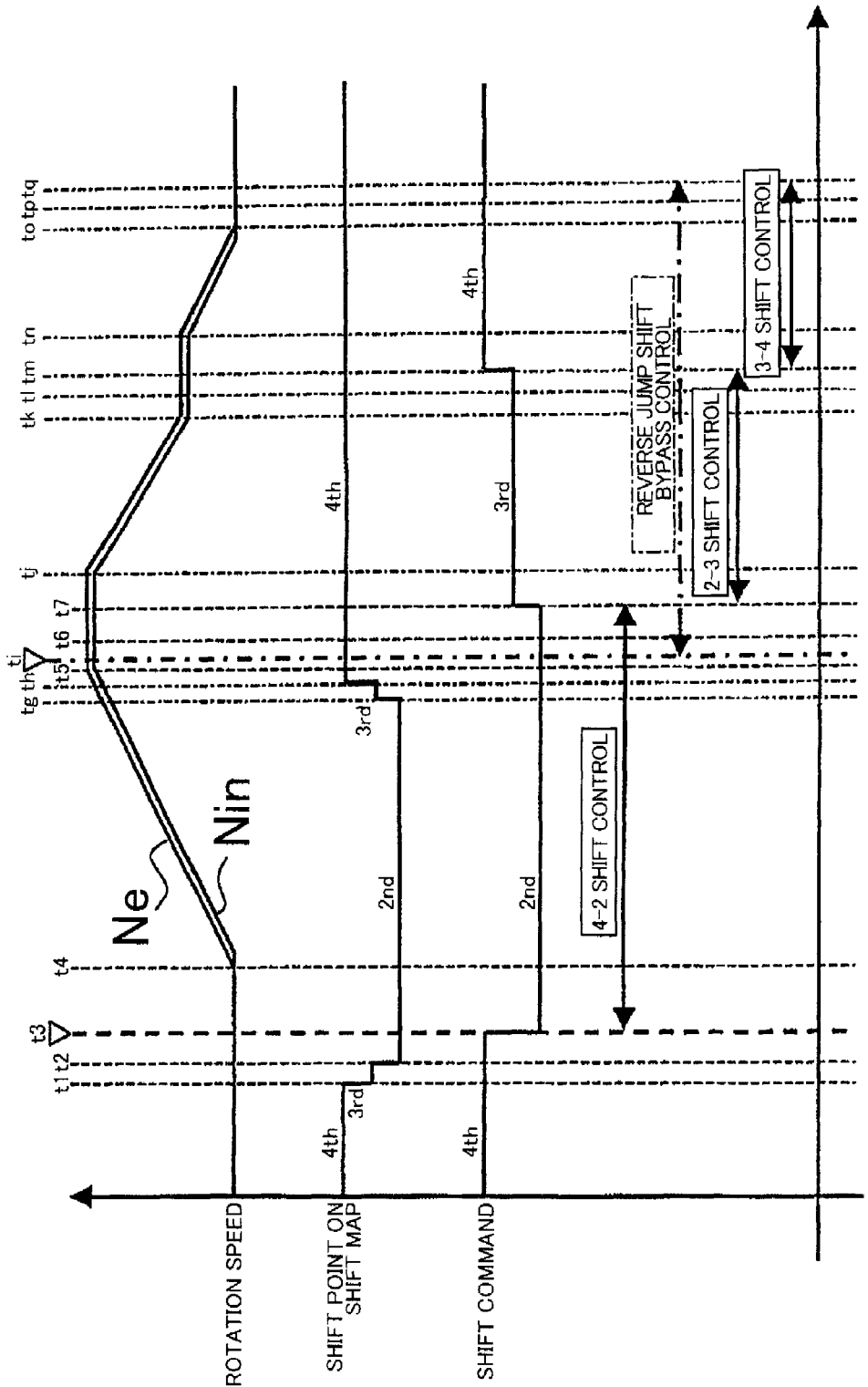

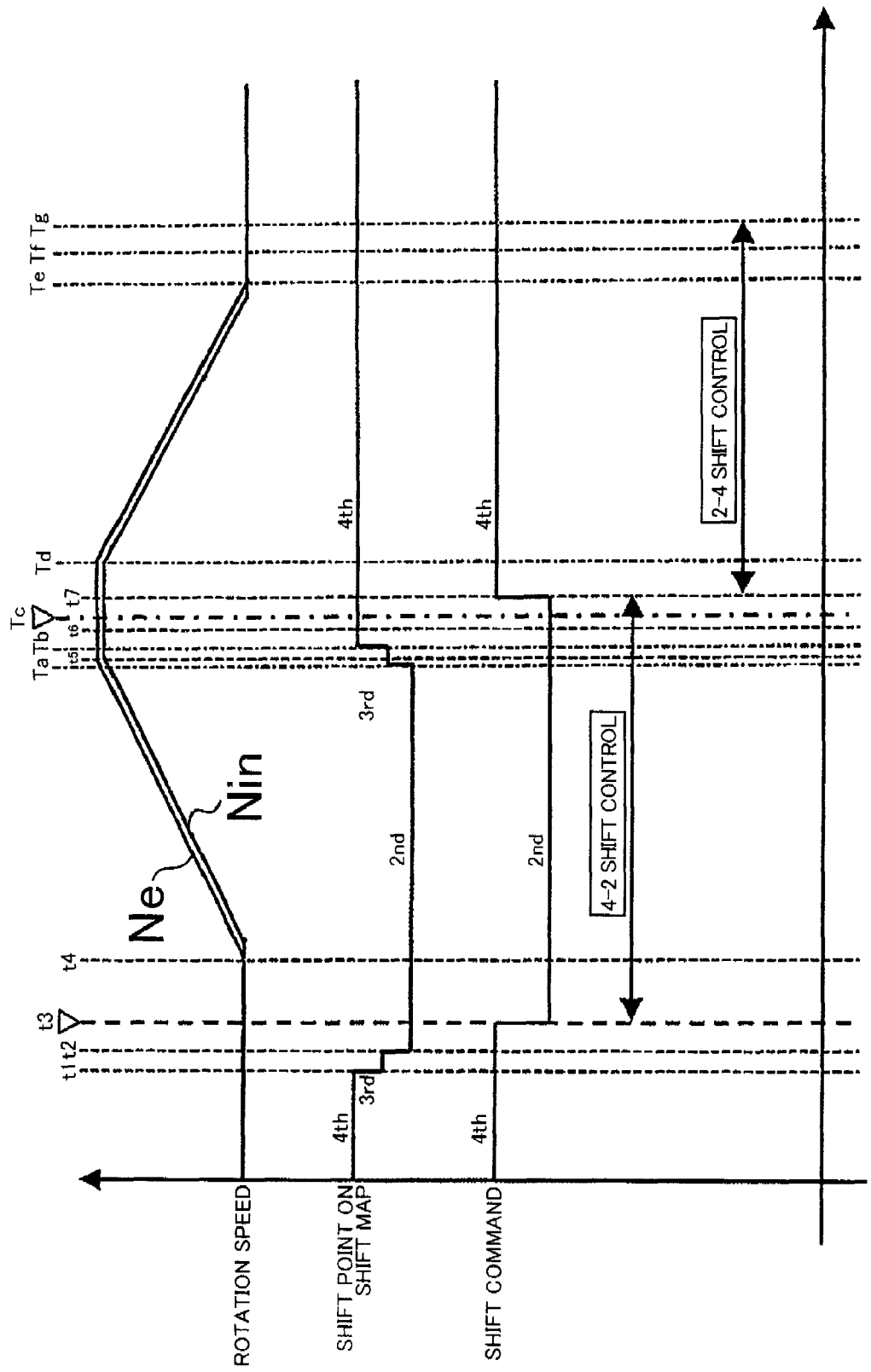

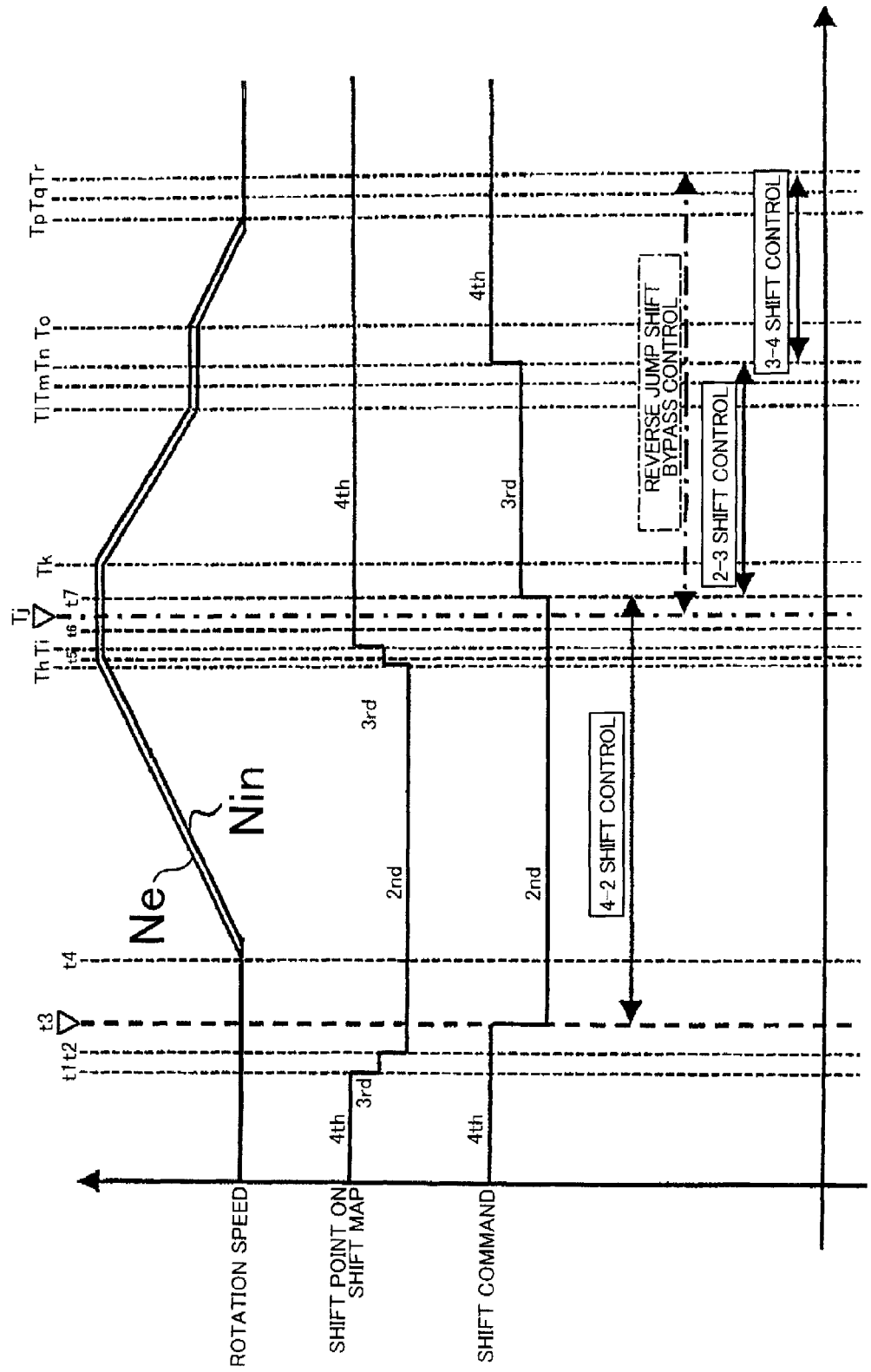

SHIFT CONTROL APPARATUS FOR AN AUTOMATIC TRANSMISSION

CROSS-REFERENCE TO RELATED PATENT APPLICATION

This application claims priority from Japanese Patent Application No. 2006-209087, filed on Jul. 31, 2006 in the Japanese Patent Office, the disclosure of which is incorporated herein in its entirety by reference.

TECHNICAL FIELD

Apparatuses consistent with the present invention relate to shift control for a stepped automatic transmission that is mounted, for example, in a vehicle, and in particular, relate to shift control apparatuses for an automatic transmission that enable the carrying out of multiple shift control and jump shift control.

BACKGROUND ART

Conventionally, a stepped automatic transmission that is mounted in a vehicle, for example, controls the engagement states of a plurality of friction engagement elements (clutches and brakes) by using a hydraulic control apparatus, and enables shifting by establishing power transmission paths in a shift speed gear train for each shift speed. In addition, in recent years, increasing the number of stages of an automatic transmission has become necessary in order to improve the fuel economy of the vehicle, and in such an automatic transmission. In order to select the optimal shift speed according to the driver's requirements (that is, the amount of accelerator pedal depression and the like), jump shifting, in which the shift speed shifts to a shift speed that is separated by two or more stages from the original shift speed in one shift is carried out (for example, a 4-2 shift, a 5-2 shift, a 2-4 shift, a 2-5 shift, and the like).

In contrast, anticipating how the driver will operate the accelerator pedal is difficult. For example, in cases in which the driver depresses and then immediately releases the accelerator pedal or releases and then immediately depresses the accelerator pedal, the situation occurs in which it is determined that there should be a next shift during the control in which the control of the clutch shifting of the friction engagement elements is being carried out after it is determined that a shift change should occur. In such a case, when the later shift control is started after waiting until the former shift control has completed, a timing lag occurs with respect to the accelerator pedal operation by the driver. Thus, there is a concern that in the case of, for example, an upshift after a downshift, a sense of dragging caused by engine braking will occur, and there is a concern that in the case of a downshift after an upshift, a sense of delay, in which the required output cannot be obtained, will occur, and this may cause a deterioration in the drivability.

Thus, in order to prevent the occurrence of the timing lag described above, and in order to improve drivability (in particular, to avoid any discomfort due to engine braking), an invention that carries out what is termed as multiple shifting has been proposed (refer to Japanese Patent Application Publication No. JP-A-HEI 11-A-108178). In multiple shifting, when it is determined that a shift should occur during the previous shift control (in particular, in the case in which it is determined that an upshift should occur during a downshift), the previous shift control is suspended, and the next (subsequent) shift control is started while overlapping the previous shift control.

SUMMARY OF THE INVENTION

A shifting map in an automatic transmission is generally structured such that the optimal shift speed is determined (selected) based on the vehicle speed and the accelerator opening angle. When the multiple shift control described above is carried out, there is frequent switching between the same shift speeds by the previous shift control and the subsequent shift control because there is little change in the vehicle speed. Switching between the same shift speeds in this manner is switching in which the friction engagement elements that carry out clutching are the same, and these same friction engagement elements are slipping continuously during two shift control operations.

In the case in which the same friction engagement elements are slipping continuously in this manner, when switching between shift speeds that are separated by one-stage (for example, a 3-2-3 shift, a 4-3-4 shift or the like), because the step of the gear change ratio (gear ratio) is small, the amount of change in the input rotation speed of the automatic transmission (that is, the engine rotation speed) is small, and the time that the friction engagement elements are slipping during the shifting is short. Thus, for example, even if multiple control is carried out from the point in time that the previous shift control operation has substantially completed such that the next shift control operation overlaps the previous shift control operation, that is, the friction engagement elements are slipping continuously for twice as much time in comparison to normal shifting, the amount of heat generation that is produced in the friction engagement elements is not of a degree that would adversely influence their durability.

However, when multiple shift control is carried out during jump shifting described above, that is, when switching between speeds that are separated by two or more stages (for example, a 4-2-4 shift, a 5-2-5 shift, or the like), the step of this gear change ratio is large, and in particular, when the vehicle speed is high (the output shaft speed is high), the amount of the change in the input rotation speed (engine rotation speed) becomes large. Thus, the time during which the friction engagement elements are slipping while shifting as described above becomes significantly longer in comparison the case of shifting one-stage. Furthermore, in the case in which the output torque of the engine is large, the amount of heat generation that is produced in the friction engagement elements becomes extremely large, and there is a concern that the durability of the friction engagement elements may be adversely affected.

Thus, in such jump shifting, it is possible to consider, for example, providing a predetermined cooling time after the previous jump shift control operation has completed, and subsequently carrying out the next jumping control operation. However, there is a concern that providing such a cooling interval may cause a time lag such as that described above, and the dragging feeling caused by engine braking and the sense of delay, in which the output cannot be obtained as required, may occur, and there is a problem in that this is not preferable in terms of drivability.

Thus, an aspect of an exemplary embodiment of the present invention to provide a shift control apparatus for an automatic transmission that is structured such that the execution of multiple shift control is permitted in the case in which, when it is determined that a reverse jump shift that returns to the previous shift speed should occur during jump shift control, the amount of the load that is generated in the friction engagement elements is within a permitted range, and thus aids in ensuring both drivability of the vehicle and the durability of the friction engagement elements.

An exemplary embodiment of the present invention provides a shift control apparatus, for an automatic transmission, that is used in a stepped automatic transmission that has a plurality of friction engagement elements that attain power transmission paths in a shift gear mechanism by engagement states and in which a shift is carried out by clutching between these friction engagement elements, and is provided with a shift control means that when it is determined that a next shift should occur during control for the shift, can execute multiple shift control in which the control for the shift that is being controlled is suspended and the control for the next shift is carried out in succession, and jump shift control can be executed that shifts to a shift speed that is separated by two or more stages by one clutch action, comprising:

load amount determining means that determine that the load amount that is applied to the friction engagement elements that carry out the clutching is within a permitted range in the case in which it is determined that a reverse jump shift that returns to the shift speed before the jump shift should occur during the control of the jump shift; and multiple control permitting means that permit the execution of multiple shift control for a reverse jump shift based on the result of the determination of the load amount detecting means; wherein, the shift control means executes multiple shift control for the reverse jump shift when permitted by the multiple control permitting means in the case in which it is determined that a reverse jump shift has occurred during the control of the jump shifting.

It is contemplated that the shift control means carries out shift control in which the shift speed is shifted to a shift speed to be shifted to by the reverse jump shift after shifting, after carrying out shift control in which the shift speed is shifted to an intermediate speed of the shift speed to be shifted to by the reverse jump shift during the shift when not permitted by the multiple control permitting means.

It is also contemplated that the shift control means selects the shift speed that is one shift stage from the shift speed that is to be shifted to by the reverse jump shift after shifting as an intermediate speed in the case in which the reverse jump shift is a shift that is three or more stages.

The load amount determining means may determine that the load amount is within the permitted range based on an input torque that is input into the shift gear mechanism.

Also, the load amount determining means may determine that the load amount is within the permitted range based on the rotation speed differences of the input shaft of the shift gear mechanism before and after a jump shift. The load amount determining means may also determine that the load amount is within the permitted range based on the shift progress rate.

It is also contemplated that the load amount determining means has a permitted range map that records data for a permitted range map in advance and determines that the load amount is within a permitted range by referring to a permitted range map.

In accordance with an exemplary embodiment of the present invention, in the case in which the load amount that is applied to the friction engagement elements that are carrying out clutching during jump shifting is within a permitted range, the multiple shift control for the reverse jump shifting is permitted, and such shifting can be carried out. Thus, there is no adverse influence on the durability of the friction engagement elements and it is possible to improve the drivability of a vehicle. In addition, in the case in which the load amount is beyond the permitted range, the multiple shift control for the reverse jump shifting is not permitted, that is, the multiple shift control is not carried out. Thus, it is possible to prevent the amount of generated heat in the friction engagement elements from becoming large, and it is possible to prevent adverse influences on the durability.

The shift control mechanism may carry out shift control in which the shift speed is shifted to a shift speed that is to be shifted to by a reverse jump shift after shifting, after carrying out shift control that shifts the shift speed to an intermediate speed of a shift speed that is to be shifted to by the reverse jump shift during the shift when multiple shift control is not permitted by the multiple control permitting means. Thus, it is possible to shift to the shift speed that is to be shifted to by the reverse jump shift after passing through the clutch shifting of friction engagement elements that are different from the friction engagement elements that carried out clutching in the jump shift. Therefore, in comparison to a case in which reverse jump shifting has been carried out, it is possible to prevent the amount of generated heat produced in each of the friction engagement elements from becoming large without the friction engagement elements slipping continuously for a long time, and it is possible to prevent any adverse influence on the durability of the friction engagement elements. In addition, in comparison to the case in which a cooling period is provided without shifting after a jump shift has been carried out, it is possible to lessen the dragging feeling and the delay feeling by shifting to an intermediate speed, and it is possible to prevent deterioration of the drivability.

In the case in which the reverse jump shift is a shift that is equal to or greater than three stages, a shift speed that is a one-stage shift from the shift speed to be shifted to by the reverse jump shift after the shift may be selected as the intermediate stage, that is, the control passes through the shift speeds that is closest to the gear change ratio to the shift speed to be shifted to. Thus, it is possible to lessen further the dragging feeling and the delay feeling, and it is possible to prevent a deterioration of the drivability.

In further accordance with an exemplary embodiment of the present invention, the load amount determining means is able to determine whether or not the load amount that is applied to the friction engagement elements is within a permitted range according to the size of the torque that is acting on the friction engagement elements that are sliding by determining that the load amount is within a permitted range based on the input torque that is input to the shift gear train mechanism.

The load amount determining means may be able to determine whether or not the load amount that is applied to the friction engagement elements is within a permitted range according to the slipping amount (the amount that absorbs the rotation speed differences by slipping) of the friction engagement elements applied during jump shifting be determining that the load amount is within a permitted range based on the rotation speed differences in the input shaft of the shift gear train mechanism before and after the jump shifting.

Also, the load amount determining means may determine whether or not the load amount that is applied to the friction engagement elements is within a permitted range according to the amount of slipping (the amount that absorbs the rotation speed differences by slipping) that is already produced in the friction engagement elements and, in particular, the length of the time of the slipping, by determining that the load amount is within the permitted range based on the shift progress rate.

The load amount determining means may have a permitted range map that records the data of the permitted range in advance, and is able to determine instantaneously whether or not the load amount is within the permitted range according to a permitted range map that is calculated in advance by taking into consideration the durability of the friction engagement elements and the like by determining that the load amount is within a permitted range by referring to the permitted range map.

BRIEF DESCRIPTION OF THE DRAWINGS

FIG. 2 is an operating table of an exemplary embodiment of the present automatic transmission.

FIG. 4A is a figure that shows a permitted range according to the relationship between the vehicle speed and the shift progress rate; FIG. 4B is a figure that shows a permitted range according to the relationship between the vehicle speed and the engine output torque; FIG. 4C is a figure that shows a permitted range according to the relationship between the engine output torque and the shift progress rate, and FIG. 4D is a figure that shows a permitted range according to the relationship between the vehicle speed, the shift progress rate, and the engine output torque.

FIG. 7A and FIG. 7B are time charts that show the case in which it is determined that a next shift has occurred during inertia phase to final control in the previous shift control, where FIG. 7A is a chart for the case in which multiple shift control for reverse jump shifting is carried out and FIG. 7B is a chart for the case in which reverse jump bypass shift control is carried out.

FIG. 8A and FIG. 8B are time charts that show the case in which it is determined that a next shift has occurred during completion control in the previous shift control, where FIG. 8A is a chart of the case in which multiple shift control for reverse jump shifting is carried out, and FIG. 8B is a chart for the case in which reverse jump bypass shift control is carried out.

DETAILED DESCRIPTION OF EXEMPLARY NON-LIMITING EMBODIMENTS

Below, exemplary embodiments of the present invention will be explained with reference to the figures. First, a schematic structure of an automatic transmission to which the present invention can be applied, and the operation of each of the shift speeds thereof will be explained with reference to FIG. 1 and FIG. 2.

An automatic transmission 3 can be advantageously used, for example, in an FF (front engine/front drive) type vehicle, and is structured such that the rotation that has been input from an engine 2 (refer to FIG. 3) can be transferred to the right and left wheels (not illustrated) by shifting through five forward speeds and one reverse speed.

Figure 1:
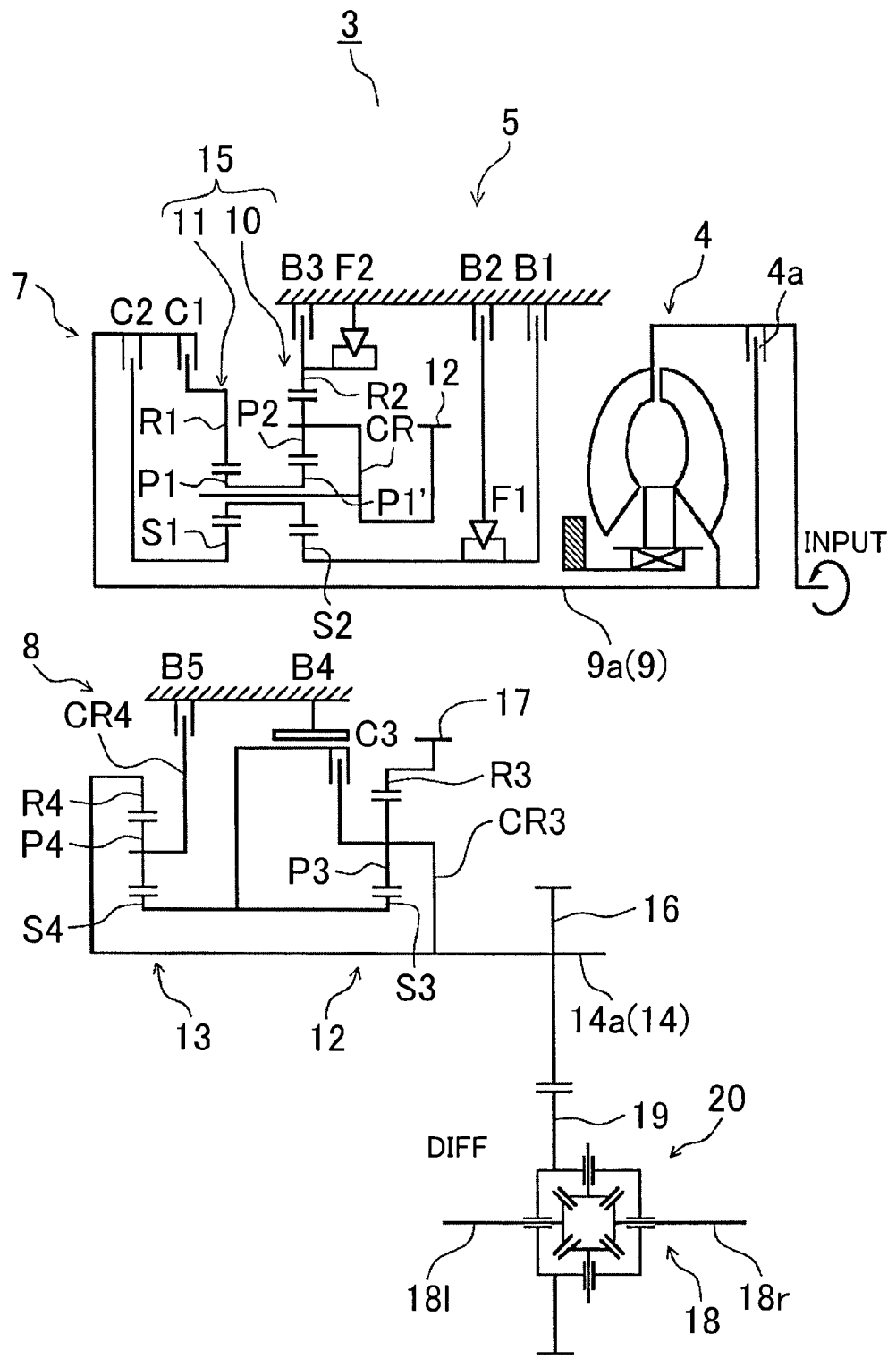
FIG. 1 is a skeleton drawing that shows the automatic transmission to which an exemplary embodiment of the present invention can be applied.

Specifically, as shown in FIG. 1, the automatic transmission 3 is structured so as to be provided with a torque converter 4, an automatic speed change mechanism (shift gear mechanism) 5 in which power transmission paths are switched depending on the state of engagement of each of the friction engagement elements (clutches C1 to C3 and brakes B1 to B5), and a hydraulic control apparatus 6 (refer to FIG. 3) that hydraulically controls the engagement state of these friction engagement elements.

The torque converter 4 includes therein oil for power transmission, and a lock-up clutch 4a. The rotational force from an engine crankshaft is input into a primary speed change mechanism 7 via a flow of the oil (fluid connection) or via the mechanical connection with the lock-up clutch 4a.

The automatic speed change mechanism 5 is structured by a three-speed primary speed change mechanism 7, a three-speed secondary speed change mechanism 8, and a differential apparatus 20, which serve as the main component units, and each of these units are joined together and accommodated in an integrated case that is integrally structured. In this integrated case, three shafts, which are disposed by being aligned with the crankshaft, are supported so as to be freely rotatable, the three shafts being a first shaft 9 (specifically, an input shaft 9a), a second shaft 14 (a countershaft 14a) that is parallel to this first shaft 9, and a third shaft 18 (left and right vehicle axles 18l and 18r).

The primary speed change mechanism 7 includes a planetary gear unit 15 that comprises a simple planetary gear 11 and a double pinion planetary gear 10. The simple planetary gear 11 comprises a sun gear S1, a ring gear R1, and a carrier CR that supports a pinion P1 that meshes with the gears S1 and R1. In contrast, the double pinion planetary gear 10 comprises a sun gear S2, a ring gear R2, and a common carrier CR, and the common carrier CR supports a pinion P1' that meshes with the sun gear S2 and a pinion P2 that meshes with the ring gear R2 such that these pinions P1' and P2 mesh with each other.

The input shaft 9a, which is linked from the engine crankshaft to the planetary gear unit 15 via the torque converter 4, can link to the ring gear R1 of the simple planetary gear unit 11 via the first (forward) clutch C1, and at the same time, can link to the sun gear S1 via the second (direct) clutch C2. In addition, this sun gear S2 can be directly locked by the first brake B1, and at the same time, can be locked by the second brake B2 via a first one-way clutch F1. Furthermore, the ring gear R2 of the double pinion planetary gear 10 can be locked by the third brake B3 and a second one-way clutch F2. In addition, the common carrier CR is linked to a counter drive gear 12, which acts as the output member of the primary speed change mechanism 7.

In the secondary speed change mechanism 8, in sequence in the axial direction of the countershaft 14a that forms the second shaft 14, an output gear 16, a first simple planetary gear 12, and a second simple planetary gear 13 are disposed, and the countershaft 14a is supported so as to be freely rotatable on the integrated case side via a bearing. The first and second simple planetary gears 12 and 13 described above are, for example, Simpson-type planetary gears, and are structured as follows.

In the first simple planetary gear 12, a ring gear R3 thereof is linked to a counter-driven gear 17 that meshes with the counter drive gear 12, and a sun gear S3 thereof is supported by the countershaft 14a so as to be freely rotatable. In addition, a pinion P3 is supported by a carrier CR3, which comprises a flange that is integrally linked to the countershaft 14a, and in addition, the carrier CR3 that supports this pinion P3 is linked to an inner hub of a UD direct clutch C3.

In the second simple planetary gear 13, a sun gear S4 thereof is linked to the sun gear S3 of the first simple planetary gear 12, and a ring gear R4 thereof is linked to the countershaft 14a. In addition, the UD direct clutch C3 is interposed between the carrier CR3 of the first simple planetary gear 12 and the linked sun gears S3 and S4, and these linked sun gears S3 and S4 can be locked by the fourth brake B4, which comprises a band brake. Furthermore, a carrier CR4 that supports a pinion P4 of the second simple planetary gear 13 can be locked by a fifth brake B5.

Note that the brakes B1 to B5 and the one-way clutch F2 described above are directly installed on the inside surface of the integrated case (indicated by the slanted line in the figure).

The differential apparatus 20 is disposed on a third shaft 18, which comprises the front wheel axles, includes a ring gear 19 that meshes with the output gear 16 and splits the rotation from this ring gear 19 into left and right rotations, and transfers the resulting rotations to the left and right front wheel axles 18*l* and 18*r*.

Next, the operation of the automatic transmission 3 that is based on the structure that has been described above will be explained according to FIG. 1 while referring to the engagement table in FIG. 2.

In the first (1st) speed in the D (drive) range, the forward clutch C1 is connected, the second one-way clutch F2 and the fifth brake B5 are actuated, and the ring gear R2 of the double pinion planetary gear 10 and the carrier CR4 of the second simple planetary gear 13 are maintained in a locked state. In this state, because the rotation of the input shaft 9*a* is transferred to the ring gear R1 of the simple planetary gear 11 via the forward clutch C1 and the ring gear R2 of the double pinion planetary gear 10 is in a locked state, the rotation of the common carrier CR is appreciably decelerated in the positive direction while the sun gears S1 and S2 rotate idly in the opposite direction. Specifically, the primary speed change mechanism 7 is in first speed, and this decelerated rotation is transferred to the ring gear R3 of the first simple planetary gear 12 in the secondary speed change mechanism 8 via the counter gears 12 and 17. In this secondary speed change mechanism 8, the carrier CR4 of the second simple planetary gear 13 is locked by the fifth brake B5 and is in first speed, and the decelerated rotation of the primary speed change mechanism 7 is further decelerated by this secondary speed control mechanism 8, and the resulting rotation is output from the output gear 16.

Note that during engine braking in first speed, the third brake B3 is actuated.

In the second (2nd) speed, in addition to the forward clutch C1, the second brake B2 is actuated, and furthermore, the actuation switches from the second one-way clutch F2 to the first one-way clutch F1, and the fifth brake B5 is maintained in the actuated state. In this state, the sun gear S2 is locked by the second brake B2 and the first one-way clutch F1, and therefore, the rotation of the ring gear R1 of the simple planetary gear 11 that has been transferred from the input shaft 9*a* via the forward clutch C1 decelerates the rotation of the carrier CR in the positive direction while the ring gear R2 of the double pinion planetary gear 10 rotates idly in the positive direction. Furthermore, this decelerated rotation is transferred to the secondary speed change mechanism 8 via the counter gears 12 and 17. Specifically, the main speed change mechanism 7 is in the second speed, and the secondary speed change mechanism 8 is in the first speed due to the engagement of the fifth brake B5. Combining the second speed and first speed, the second speed is attained in the automatic transmission 3 overall.

Note that during engine braking in second speed, the first brake is actuated. This is identical during engine braking in third speed and fourth speed, which will be described below.

In the third (3rd) speed, the forward clutch C1, the second brake B2, and the first one-way clutch F1 are maintained as-is in an engaged state, the engagement of the fifth brake B5 is released, and the fourth brake B4 is engaged. Specifically, the primary speed change mechanism 7 is maintained as-is, the rotation during second speed described above is transferred to the secondary speed change mechanism 8 via the counter gears 12 and 17, and in the secondary speed change mechanism 8, the rotation from the ring gear R3 of the first simple planetary gear 12 is output from the carrier CR3 as second speed rotation due to the sun gear S3 being held stationary. Therefore, the third speed of the automatic transmission 3 overall is obtained by the second speed of the primary speed change mechanism 7 and the second speed of the secondary speed change mechanism 8.

In the fourth (4th) speed, the primary speed change mechanism 7 is similar to the second speed and the third speed described above, in which the forward clutch C1, the second brake B2, and the first one-way clutch F1 are engaged, and in the secondary speed change mechanism 8, the fourth brake B4 is released and the UD direct clutch C3 is engaged. In this state, direct rotation is obtained in which the ring gear R3 and the sun gears S3 and S4 of the first single planetary gear 12 are linked, and the planetary gears 12 and 13 rotate integrally. Therefore, the second speed of the primary speed change mechanism 7 and the direct link (third speed) of the secondary speed change mechanism 8 are combined, and in the automatic transmission 3 overall, the fourth speed rotation is output from the output gear 16.

In the fifth (5th) speed, the forward clutch C1 and the direct clutch C2 are engaged, the rotation of the input shaft 9*a* is transferred to both the ring gear R1 and the sun gear S1 of the simple planetary gear 11, and the primary speed change mechanism 7 establishes directly linked rotation in which both gear units 10 and 11 rotate integrally. In addition, the secondary speed change mechanism 8 establishes a direct rotation in which the UD direct clutch C3 is engaged, and therefore, the third speed (direct link) of the primary speed change mechanism 7 and the third speed (direct link) of the secondary speed change mechanism 8 are combined, and in the automatic transmission 3 overall, the fifth speed rotation is output from the output gear 16.

Note that in the R (reverse) range, in the case in which the vehicle speed increases at least 7 km/h or decreases at least 7 km/h, and coasts forward at 7 km/h or more, similar to the N (neutral) range, the primary speed change mechanism 7 rotates freely. In addition, in the case in which the vehicle has substantially come to a stop, at 7 km/h or less, the direct clutch C2 and the third brake B3 are engaged, and the fifth brake 5 is engaged. In this state, the rotation of the input shaft 9*a* is transferred to the sun gear S1 via the direct clutch C2, and the ring gear R2 of the double pinion planetary gear 10 is locked by the third brake B3. Thus, the carrier CR also rotates in reverse while the ring gear R1 of the simple planetary gear 11 is idled in the reverse direction, and this reverse rotation is transferred to the secondary speed change mechanism 8 via the counter gears 12 and 17. In the secondary speed change mechanism 8, the carrier CR4 of the second simple planetary gear 13 is also locked in the reverse rotation direction based on the fifth brake B5, and the first speed is maintained. Therefore, the reverse rotation of the primary speed change mechanism 7 and the first speed rotation of the secondary speed change mechanism 8 are combined, and a reverse decelerated rotation is output from the output shaft 16.

Next, the configuration of the shift control apparatus for the automatic transmission according to an exemplary embodiment of the present invention will be explained with reference to FIG. 3.

Figure 3:
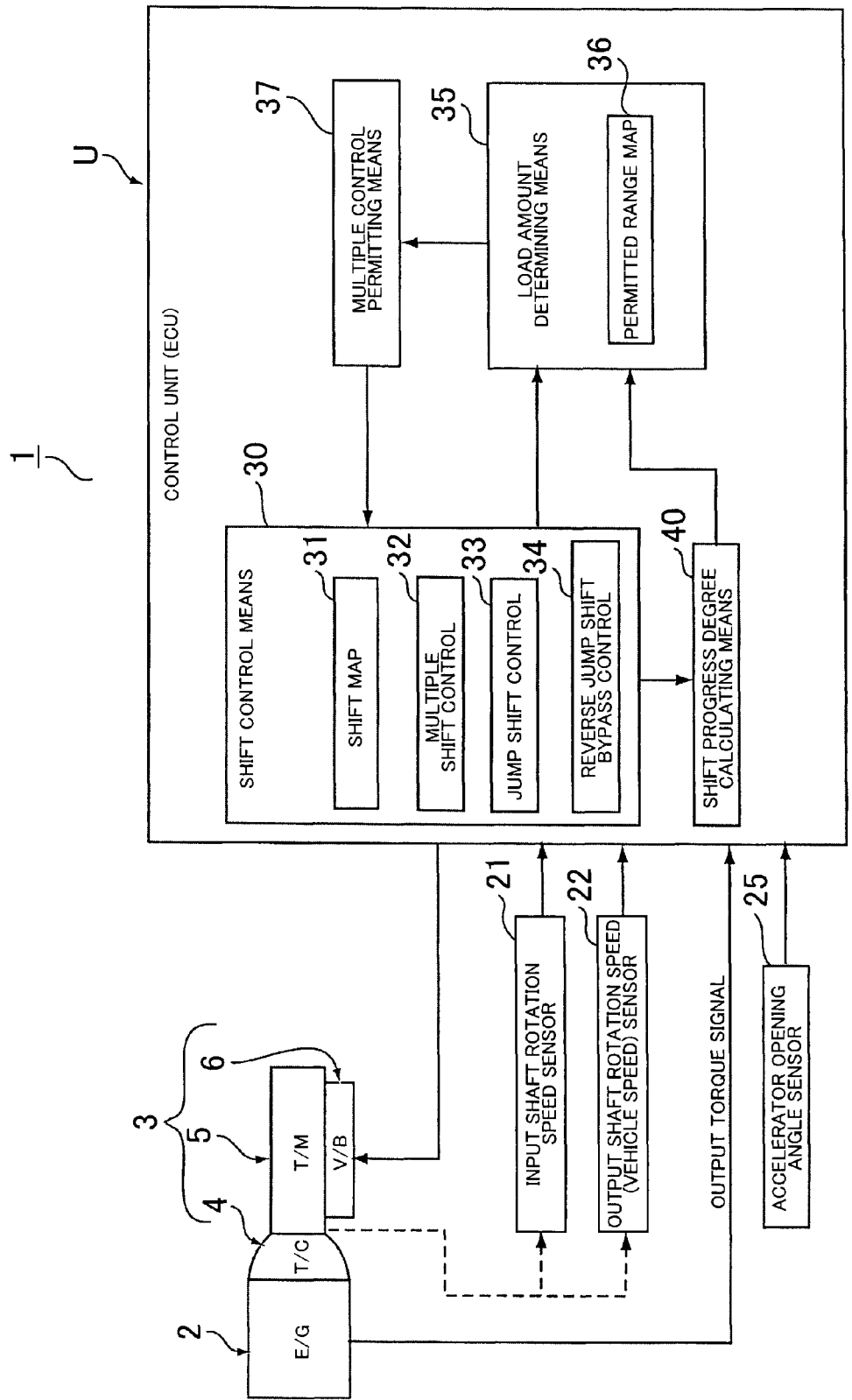
FIG. 3 is a block diagram that shows the shift control apparatus for an automatic transmission according to an exemplary embodiment of the present invention.

As shown in FIG. 3, the shift control apparatus 1 of this automatic transmission includes a control unit (ECU) U for hydraulically controlling (electronic control command) the automatic transmission 3 (and engine 2), and the control unit U is connected to an input shaft rotation speed sensor 21 that is provided in the automatic transmission 3 and that detects the rotation speed of the input shaft 9a, an output shaft rotation speed (vehicle speed) sensor 22 that is similarly provided in the automatic transmission 3 and that detects the rotation speed of the countershaft 14a, and an accelerator opening angle sensor 25 that is provided at the driver's seat (not illustrated) and that detects the amount of depression of the accelerator pedal. In addition, the control unit U is connected to the engine 2, and is structured so as to be able to input an output torque signal that the engine 2 outputs as a signal after calculating the output torque that is being output from the output shaft (crank shaft) thereof.

Note that the output shaft rotation speed sensor 22 detects the rotation of the countershaft 14a, but the countershaft 14a is always linked to the differential apparatus 20 and the left and right front wheels, which means that the speed of the vehicle can be detected according to the gear ratios of the differential apparatus 20 and the external diameter of the wheels. In addition, the device for detecting the vehicle speed in this manner is not limited to one which detects the rotation speed of the countershaft 14a, and a device that detects the rotation speed of the left and right wheel axles 18l and 18r or a device that detects the rotation speed of the left and right front wheels or the back wheels may also be used.

In contrast, the control unit U is structured so as to be provided with a shift control means 30 that includes a shift map 31 and that enables the carrying out of control of multiple shift control 32, jump shift control 33, reverse jump shift bypass control 34 and the like, which will be described above, a shift progress degree calculating means 40, and a load amount determining means 35 that includes a permitted range map 36, and a multiple control permitting means 37, all of which will be explained below in detail.

When the shift control means 30 refers to the shift map 31 (detailed illustration thereof omitted) and detects that the speed has changed from a current shift speed range to a next shift speed range (has exceeded the shift point) based on an accelerator opening angle θd that is detected by the accelerator opening angle sensor 25 and a vehicle speed V that is detected by the output shaft rotation speed sensor 22, it is determined that shifting (an upshift or a downshift) should occur after the passage of a predetermined amount of time, and shift control related to the determined shift is executed. Specifically, in this shift control, in order to switch from the current shift speed to the next shift speed in the automatic transmission 3, a clutching shift between the friction engagement elements is carried out in which an electric control command is provided to a solenoid valve (not illustrated) in the hydraulic control apparatus 6. Normally, unless the accelerator opening angle θd changes rapidly, it is determined that a one-stage shift should occur, that is, the shift control is carried out one-stage at a time.

The multiple shift control 32 that is carried out by the shift control means 30 is control for the case in which it is determined that the next shift should occur during shift control as has been described above, and it is control in which the next shift control is started after suspending the previous shift control, or control in which the next shift control is carried out in succession after the previous shift control has completed.

Note that in the automatic transmission 3 in which shifting is carried out by the clutching of the friction engagement elements described above, multiple shift control, in which the next shift control is carried out after suspending the previous shift control, is control for the case in which the engagement or the release of the same friction engagement elements is reversed midway, that is, control for the case of switching between the same shift speeds. Alternately, in multiple shift control for the case in which the previous shift control and the next shift control are different shift speeds, the clutching of the friction engagement elements during the next shift control is not carried out unless the clutching of the friction engagement elements due to the previous shift control has completed. Thus, the next shift control is necessarily carried out in succession after the previous shift control has completed. In the present specification, this successive control is also referred to as "multiple shift control" because the determination that shifting should occur overlaps the previous shift control.

In the case in which, for example, the accelerator opening angle θd has changed rapidly, the jump shift control 33 that is carried out by the shift control means 30 described above is control in which it is determined that a shift to a shift speed that is separated by two or more stages should occur, and a shift speed that is shifted as such is separated by two or more stages by using one clutching shift. This operation occurs in the case in which, based on the accelerator opening angle θd and the vehicle speed V, the region of the shift speed on the shift map 31 changes one-stage and then, within a predetermined time interval (that is, before outputting this shift determination), the region of the shift speed further changes one or more stages, that is, the case in which, within a predetermined time interval (dead zone), the region of the shift speed has changed to the region of a shift speed that is separated by two or more stages.

In addition, a jump shift that returns to the shift speed before the previous jump shifting due to the execution of the multiple shift control 32 during the execution of jump shift control 33 (for example, a 2-4 shift by multiple shift control during a 4-2 shift) is a jump shift that reverses the previous jump shift. Thus, in order to distinguish this jump shifting from the previous jump shift, in the following explanation, this return jump shifting will be referred to as "reverse jump shifting", and the control therefore will be referred to as "reverse jump shift control". This reverse jump shift control is executed when permitted by the multiple control permitting means 37, which will be explained below in detail.

Note that the automatic transmission 3 that has been explained in the present exemplary embodiment is structurally divided into the primary speed change mechanism 7 and the secondary speed change mechanism 8. For example, in a 5-3 shift, a 3-5 shift, a 5-2 shift, a 2-5 shift, a 4-1 shift, a 1-4 shift and the like, it is necessary to carry out shifting in both speed change mechanisms 7 and 8 (that is, the clutching of a total of four friction engagement elements is necessary), and the rotating state of each of the members may become unstable. Thus, except when the shift is a 4-2 shift or a 2-4 shift, it is substantially impossible to carry out the jump shift control. However, this is simply due to the configuration of the automatic transmission, and in particular, when the speed control mechanism is a serial automatic transmission (the primary speed change mechanism and the secondary speed change mechanism are not separated), and for example, if there are no disadvantages with respect to the structure of the hydraulic circuits or the like, many types of jump shift control, such as that described above, are possible. In addition, accompanying the recent increases in the number of stages in automatic transmissions, automatic transmissions have been proposed in which multiple shifting is attained in, for example, eight forward speeds, six forward speeds, and the like (refer, for example, to Japanese Patent Application Publication No. JP-A-2003-130152 and Japanese Patent Application Publication No. JP-A-2003-240068), and among such automatic transmissions, there are ones that can carry out (or there is the possibility to carry out) jump shift control such as, for example, an 8-6 shift, an 8-5 shift, a 6-4 shift, a 5-3 shift, and the like. Therefore, in the present exemplary embodiment, although the 4-2 shift and 2-4 shift are explained as examples of jump shift control, the jump shift control is not limited to this example.

The reverse jump shift bypass control 34 is carried out by the shift control means 30. This control is carried out when the reverse jump shift control has not been permitted by the multiple control permitting means 37, which will be described below in detail. This control shifts to an intermediate speed (for example, the third speed in 2-4 shift) among the shift speeds that are to be shifted to by the reverse jump shifting before and after shifting in succession after the previous jump shift control has completed. Then the shift speed is shifted in succession to the shift speed (that is, fourth speed) that is to be shifted to by the reverse jump shift. In addition, in the case in which the reverse jump shift is shifting to a speed shift that is separated by three or more stages (for example, a 2-5 shift or the like), the shift speed (specifically, the fourth speed, which is one-stage closer to the second speed side than the fifth speed) that is a one-stage closer to the front side than the shift speed (specifically, the fifth speed) that is to be shifted to by the reverse jump shift is selected as the intermediate speed described above.

The shift progress degree calculating means 40 described above calculates a shift progress degree $\alpha$ (%) from the rotation speed ratio of the rotation speed of the input shaft 9a (below, referred to as the "input rotation speed Nin") that has been detected by the input shaft rotation speed sensor 21 and the rotation speed of the output shaft 14a (below, referred to as the "output rotation speed Nout") that has been detected by the output shaft rotation speed sensor 22 based on the degree of the progress toward the gear change ratio of the next shift speed to which the shift speed is shifting, during each type of shifting that is carried out by the shift control means 30 described above.

When the shift control means 30 described above determines that a reverse jump shift should occur, the load amount determining means 35 refers to a permitted range map 36, such as one of those shown in FIG. 4, to determine whether the amount of the load applied to the friction engagement elements, which carry out clutching due to jump shifting and reverse jump shifting being carried out in succession, is within a permitted range. The amount of this load is substantially equivalent to the amount of heat that is produced in the friction material of the friction engagement elements. Examples of such causes are the transmitted torque that the friction engagement elements bear while slipping and the time and amount of this slipping (the absorbed amount of the rotation speed difference). Among these, the transmitted torque that the friction engagement elements bear has a value that depends on the input torque that is input from the engine 2 to the input shaft 9a, that is, the output torque Te of the engine 2 (below, referred to as the "engine torque"). In addition, the time and amount of the slipping are values that depend on the progress of the previous jump shift, that is, the shift progress degree $\alpha$ that is calculated by the shift progress degree calculating means 40, and the difference between the input rotation speeds Nin before and after jump shifting, that is, the vehicle speed V.

Figure 4A:
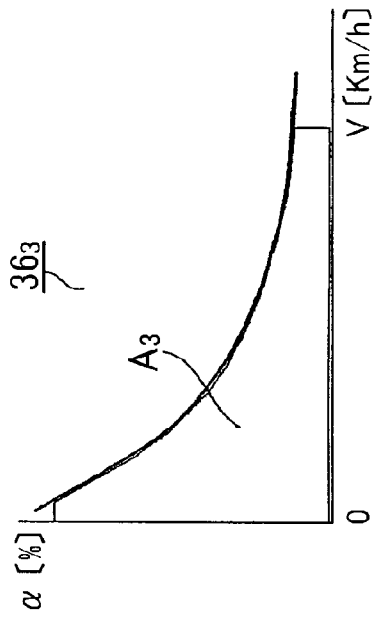
FIG. 4A to FIG. 4D are figures that show examples of permitted ranges, where
Figure 4D:
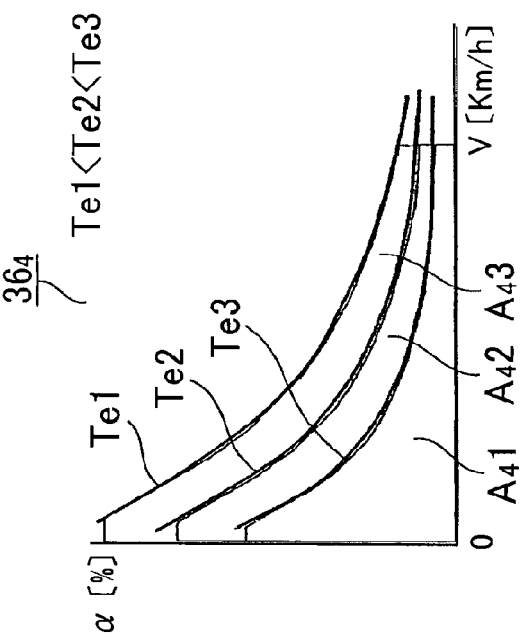
Figure 4B:
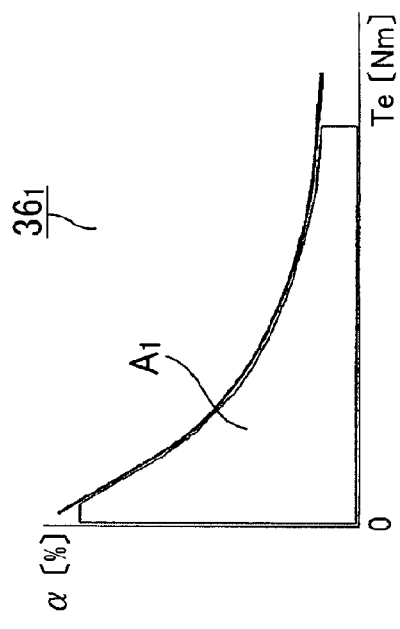
Figure 4C:
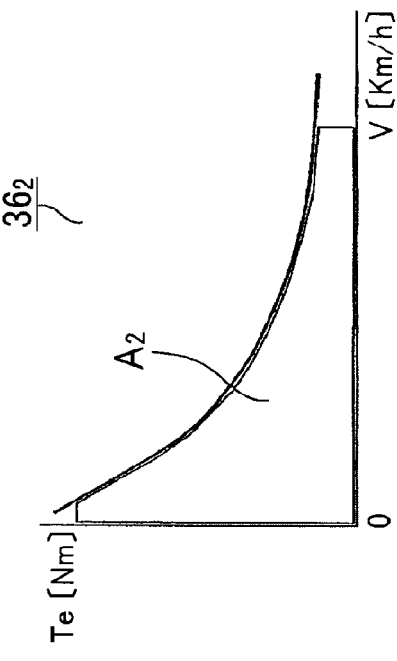

Here, four permitted range maps $36_1$ to $36_4$ that are shown in FIGS. 4A to 4D can be considered as permitted range maps 36 for finding the permitted range after calculating the load amount in advance. The permitted range map $36_1$ that is shown in FIG. 4A is one that records the data of a permitted range $A_1$ that is found by calculating in advance the permitted range of the load amount based on the engine torque Te (Nm) and the shift progress degree $\alpha$ (%). In addition, the permitted range map $36_2$ that is shown in FIG. 4B is one that records the data of a permitted range $A_2$ that is found by calculating in advance the permitted range of the load amount based on the engine torque Te (Nm) and the vehicle speed V (km/h). Furthermore, the permitted range map $36_3$ that is shown in FIG. 4C is one that records the data of a permitted range $A_3$ that is found by calculating in advance the permitted range of the load amount based on the shift progress degree $\alpha$ (%) and the vehicle speed V (km/h).

In addition, the permitted range map $36_4$ that is shown in FIG. 4D is one that records the data of the permitted ranges $A_41$, $A_42$, and $A_43$ that are found by calculating in advance the permitted range of the load amount based on the shift progress degree $\alpha$ (%), the vehicle speed (km/h), and three-stage engine torques Te1, Te2, and Te3 (Nm). Note that in this permitted range map $36_4$, the engine torques Te1, Te2, and Te3 are related by Te1<Te2<Te3. In addition, the intermediate values of these engine torques Te1, Te2, and Te3 can be found, for example, by a calculation that uses linear compensation or the like. Therefore, the permitted range map $36_4$ is used in which the permitted ranges for three-stage engine torques Te1, Te2, and Te3 are calculated in advance, but a permitted range map $36_4$ can be used in which the permitted ranges for engine torques Te that have two stages or four or more stages are calculated.

The permitted range maps $36_1$ to $36_4$ described above are ones that set the permitted range A based on two or three among the engine torque Te, the shift progress degree $\alpha$, and the vehicle speed V, and of course, the permitted range is set such that the load amount is permitted as the engine torque becomes lower, the shift progress degree $\alpha$ becomes smaller, and the vehicle speed becomes lower. Any of these permitted range maps $36_1$ to $36_4$ may be used, and thus, in the following explanations, the expression "permitted range map 36" is simply used to indicate one among these permitted range maps $36_1$ to $36_4$.

In contrast, the multiple control permitting means 37 permits multiple shift control 32 of reverse jump shifting in the shift control means 30 when the load amount determining means 35 described above determines that the load amount of the friction engagement elements is within a permitted range A based on the permitted range map 36. The shift control means 30 that receives this permission executes reverse jump shift control either after suspending the jump shift control 33 that is being carried out at this time or in succession after this jump shift control 33. Alternatively, in the case in which the load amount determining means 35 determines that the load amount is outside the permitted range A and the multiple control permitting means 37 does not permit the shift control means 30 to execute the multiple shift control 32, the shift control means 30 executes the reverse jump shift bypass control 34 described above.

Next, the control by this shift control apparatus 1 of this automatic transmission will be explained with reference to FIG. 5 through FIG. 8, using as an example the case in which it is determined that a 2-4 shift, which is the next reverse jump shift, is being carried out during 4-2 shift control, which is a jump shift.

First, the 4-2 shift control, which is a normal power-on downshift (the case in which multiple shift control is not carried out), is carried out broadly in the sequence: initial control, inertia phase control, final control, and completion control. Specifically, during initial control, the play between a piston and a friction material is reduced by raising an oil pressure (below, referred to simply as the "oil pressure of the brake B5") of a hydraulic servo of the brake B5 (the friction engagement element on the engaging side), an oil pressure (below, referred to simply as the "oil pressure of the clutch C3") of a hydraulic servo of the clutch C3 (the friction engagement element on the release side) is lowered one-stage (down to the standby pressure), and subsequently the oil pressure is gradually decreased until immediately before the clutch C3 begins to slip.

When the initial control has completed, the control proceeds to the inertia phase control. In the inertia phase control, the oil pressure of the clutch C3 is further lowered, and thereby, the power transmission between the engine 2 and the drive wheels (the output shaft 14a) is gradually cut off by the automatic speed change mechanism 5, and the rotation speed Ne of the engine 2 for which the load has been reduced starts to increase. Then the oil pressure of the brake B5 is increased while carrying out feedback control according to the shift progress degree α, and the brake B5 is gradually engaged, that is, the rotation speed in the automatic speed change mechanism 5 is substantially changed. In addition, in the meantime, the oil pressure of the clutch C3 is temporarily raised, and while preventing an excessive burst of the engine speed Ne, the processing moves to the final control when the shift progress degree α becomes equal to or greater than a predetermined value. Additionally, in this final control, the oil pressure of the clutch C3 is lowered in order to reach 0, and at the same time, the rise in the oil pressure of the brake B5 is quickened, and the engagement of the brake B5 is completed, that is, the brake B5 does not slip.

Then, when the engagement of the brake B5 has completed, the control proceeds to completion control. In the completion control, the oil pressure is raised in the hydraulic servo of the brake B5 by, for example, switching so that the line pressure is input as-is, that is, the brake B5 is completely engaged, and the shift control is completed.

In this shift control apparatus 1 for an automatic transmission, the timing for determining that a 2-4 shift has occurred during the above 4-2 shift control is divided into three cases: the case during initial control, the case during inertia phase control and the final control, and the case during completion control.

Among these, in the case in which it is determined that a 2-4 shift should occur during initial control for 4-2 shift control, in the automatic speed change mechanism 5, the rotation change has not started (that is, the shift progress degree α=0%), or specifically, only the oil pressure of the clutch C3 has been relieved and the reducing of the play of the hydraulic servo of the brake B5 has been carried out, and the clutch C3 and the brake B5 are thus in a non-slip state. Thus, the shift control means 30 immediately suspends the 4-2 shift control and executes the 2-4 shift control (the multiple shift control 32 for reverse jump shifting). Specifically, the oil pressure of the clutch C3, which has started to fall, is raised again, and at the same time, the oil pressure of the brake B5, which has started to rise, is drained (discharged), and thereby the speed returns to the fourth speed.

Figure 7A:
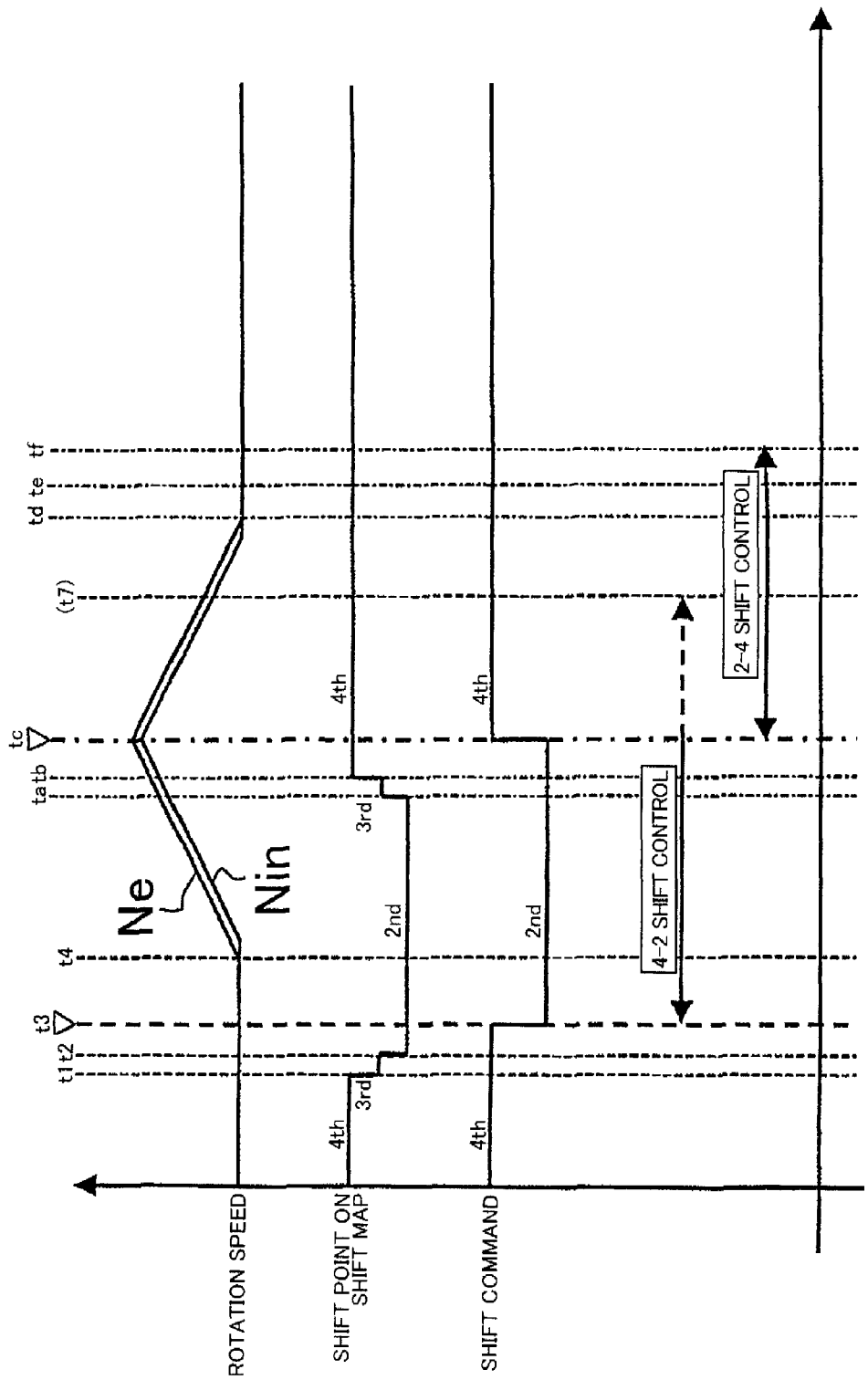

Next, the case in which it is determined that a 2-4 shift should occur during the inertia phase control and the final control of 4-2 shift control (that is, during a change in rotation) will be explained with reference to FIG. 5 and FIG. 7. First, as shown in FIG. 7A, at time t1, the accelerator pedal is rapidly depressed by the driver and the accelerator opening angle θd increases. When the shift point is exceeded that defines transiting from the region of the fourth speed to the region of the third speed in the shift map 31, and then, within a predetermined time interval, the shift point is exceeded that defines transiting from the region of the third speed to the region of the second speed at time t2 in the shift map 31, the shift control means 30 determines that a 4-2 shift should occur at time t3, which is the time at which a predetermined time interval has passed from the time t2.

Thereby, from the time t3, in the shift control means 30, the shift command (flag) is set to the second speed, and the 4-2 shift control starts. Next, the initial control described above is carried out by the shift control means 30 issuing an electric control command to the hydraulic control apparatus 6. At the time t4, the inertia phase control, in which the actual shift in the automatic speed change mechanism 5 is carried out, starts, and the input rotation speed Nin is increased depending on the increase in the engine rotation speed Ne that accompanies the slipping of the clutch C3. In addition, at this time, the brake B5 is gradually engaged in the slipping state and the automatic speed change mechanism 5 gradually switches to the second speed, that is, the shift progress degree α increases. Note that during the shift, because the lock-up clutch 4a is released to provide power transmission via the oil by the torque converter 4, the input rotation speed Nin is slightly delayed with respect to the rise of the engine rotation speed Ne.

Here, for example, at time ta, the accelerator opening angle θd decreases because the accelerator pedal has been released by the driver. When the shift point that defines transiting from the region of the second speed to the region of the third speed in the shift map 31 is exceeded, and then, at time tb, which is within a predetermined time interval, the shift point is exceeded that defines transiting from the region of the third speed to the region of the fourth speed in the shift map 31, the shift control means 30 determines that a 2-4 shift should occur at time tc, at which a predetermined time interval has passed from the time tb.

Figure 5:
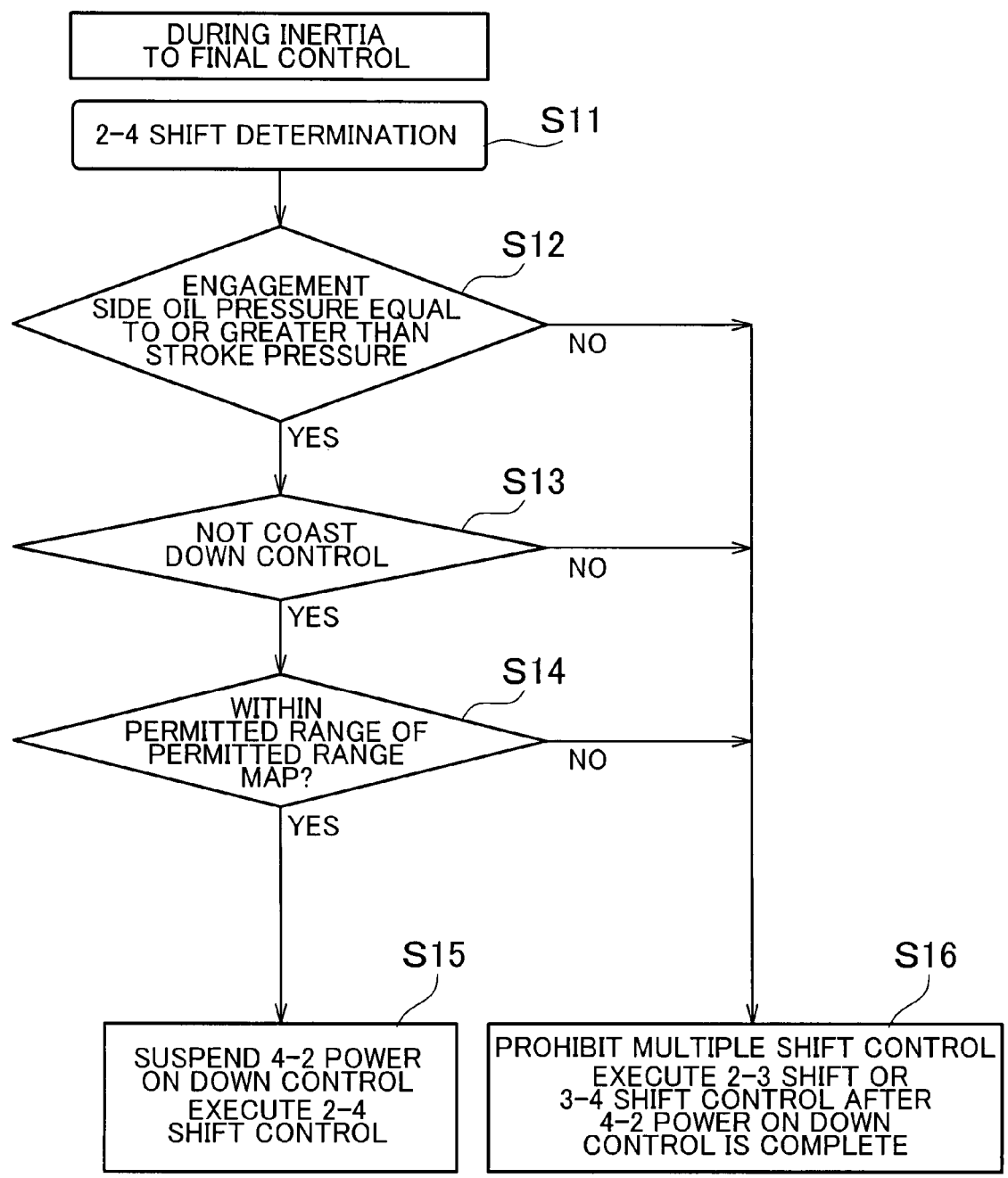
FIG. 5 is a flowchart that shows the control when it is determined that a 2-4 shift has occurred during the inertia phase to final control.

Thereby, the control unit U starts the control (S11) that is shown in FIG. 5. First, based on a hydraulic command value from the shift control means 30, the control unit U determines whether or not the oil pressure (engagement side oil pressure) of the clutch C3, which is on the engagement side in a 2-4 shift, is equal to or greater than a stroke pressure that causes the piston to stroke. In the case in which this oil pressure is already less than the stroke pressure (No in S12), because the clutch C3 cannot immediately engage (because it is necessary to reduce play), the processing proceeds to step S16, which is described below.

Normally, during inertia phase control, because the oil pressure of the clutch C3 is equal to or greater than the stroke pressure (Yes in S12), the processing proceeds to step S13, and it is determined whether or not the 4-2 shift control that is currently being carried out is coast down control (not due to acceleration being on, that is, it is power-off downshift shift control). The case in which this 4-2 shift control is coast down control (No in S13) includes, for example, the case of a manual operation of the shift lever by the driver and the case of a rapid deceleration due to the foot brake being depressed. Because this is a case in which the engine speed is raised due to dragging caused by the slipping of the brake B5 and not a rise of the engine rotation speed Ne due to power being turned on, it is anticipated that a large load is already being applied to the brake B5, and thus the processing proceeds to step S16, which will be described below.

In this exemplary embodiment, the 4-2 shift is a power-on downshift due to the accelerator pedal being depressed, and because it is not coast down control (Yes in S13), the processing proceeds to step S14, and the load amount determining means 35 determines whether or not the load amount is within the permitted range of the permitted range map 36. The example that is shown in FIG. 7A is the case in which, for example, the engine output torque Te, the vehicle speed V, the shift progress degree α, and the like are within the permitted range of the permitted range map 36 (refer to FIG. 4). The load amount determining means 35 determines that the load amount that is being applied to the clutch C3 and the brake B5 is within the permitted range (Yes in S14), and the processing proceeds to step S15.

Then, based on the result of the determination of the load amount determining means 35, the multiple control permitting means 37 permits the multiple shift control 32 for reverse jump shifting by the shift control means 30, and the shift control means 30 that receives this permission starts the multiple shift control 32 for reverse jump shifting. Thereby, at the time tc, the shift command in the shift control means 30 is set to the fourth speed, the 4-2 shift control that should originally have completed at time t7 is suspended, and the 2-4 shift control is started.

Thereby, the oil pressure of the brake B5 is lowered and the oil pressure of the clutch C3 is increased by the shift control means 30, and the input rotation speed Nin is changed according to the gear change ratio from second speed to fourth speed, that is, the input rotation speed is reduced. In addition, at time td, when the rotation change of the input rotation speed Nin has substantially ceased, completion control is carried out in which the oil pressure of the brake B5 is made nil and the oil pressure of the clutch C3 is raised. Then at time te, the clutch C3 is completely engaged by switching the oil pressure thereof to, for example, the line pressure, and at time tf, the 2-4 shift control is complete.

In contrast, FIG. 7B shows the case in which, similar to FIG. 7A, when the 4-2 shift control is being carried out, the driver releases the accelerator pedal, for example, at time tg, at which the 4-2 shift has progressed beyond the time ta. The speed changes from second speed to third speed in the shift map 31, and then, at time th, the speed changes from third speed to fourth speed. The shift control means determines that a 2-4 shift should occur, for example, at time ti, which is later than time t5, at which the 4-2 shift control has entered final control.

In the case that is shown in FIG. 7B, for example, the shift progress degree α is large, that is, the time during which the clutch C3 and the brake B5 have been slipping is long, and the amount of slipping (the amount that absorbs the rotation speed difference) is also large. Thus, in step S14 in FIG. 5, the load amount determining means 35 determines that the load amount is not within the permitted range based on the permitted range map 36 (No in S14), and the processing proceeds to step S16.

Thereby, based on the result of the determination of the load amount determining means 35, the multiple control permitting means 37 does not permit the multiple shift control 32 for a reverse jump shift by the shift control means 30, and the shift control means 30 that receives this denial starts the reverse jump shift bypass control 34. Thereby, first, the shift control means 30 continues the 4-2 shift control without being suspended, at time t6, the control proceeds from final control to completion control, and at time t7, the 4-2 shift control is complete.

Next, the shift control means 30 carries out initial control after starting 2-3 shift control, the oil pressure of the brake B5 is lowered by one-stage, and the play is reduced by increasing the oil pressure of the brake B4. Next, at time tj, control proceeds to the inertia phase control, the oil pressure of brake B5 is lowered and the brake B5 is released. At the same time, the oil pressure of the brake B4 is raised while carrying out feedback control that depends on the shift progress degree, and the brake B4 is engaged. At this time, because this is a power-up shift in which the accelerator pedal is released, the engine rotation speed Ne is lowered by releasing the brake B5, and only the brake B4 is engaged while slipping in line with the decrease in this engine rotation speed Ne. Thus, even if the brake B5 is slipping slightly, a large load (heat generation) is not produced in the brake B5.

Then, at time tk, when the inertia phase has ended, the control proceeds to final control, the oil pressure of the brake B4 is rapidly raised, and then at time tl, the control proceeds to completion control. The oil pressure of the brake B4 is increased by, for example, switching to input as-is the line pressure, that is, the engagement of the brake B4 is complete, and at time tm, the 2-3 shift control is completed.

Next, the shift control means 30 carries out initial control by starting the 3-4 shift control from the time tm, and lowers the oil pressure of the brake B4 one-stage and reduces the play by increasing the oil pressure of the clutch C3. Next, at time tn, the control proceeds to the inertia phase control, the brake B4 is released, and at the same time, the clutch C3 is engaged while simultaneously carrying out feedback control. At this time, the engine rotation speed Ne is lowered by releasing the brake B4, the clutch C3 is engaged while slipping in line with the lowering of the engine rotation speed Ne. However, an interval is established that is equivalent to the time (time t7 to Tn) of the 2-3 shift after completing (time t7) the 4-2 shift control and the clutch C3 cools during this interval, and a load (heat generation) is not continuously generated at the clutch C3. In addition, in comparison to the case in which, for example, the 2-4 shift is carried out, the slipping time of the clutch C3 becomes appreciably short, and thus, the load (heat generation) on the clutch C3 is appreciably reduced by an equivalent amount.

In addition, at time to, the control proceeds to final control when the inertia phase has ended, and the oil pressure of the clutch C3 is rapidly raised. Then at time tp, the control proceeds to completion control, the engagement of the clutch C3 is completed, and at time tq, the 3-4 shift control is completed. Thereby, because the 2-3-4 shift is completed and the shift to the fourth speed in response to the return of the accelerator pedal is complete, the reverse jump shift bypass control 34 is completed.

Next, the case in which it is determined that a 2-4 shift has occurred during the completion control of a 4-2 shift control will be explained with reference to FIG. 6 and FIG. 8. Note that the 4-2 shift control is similar to that which was explained with reference to FIG. 7B, the thus the explanation thereof will be omitted.

As shown in FIG. 8A, for example, at time Ta, which is just before the end of the inertia phase, when the accelerator pedal has been released by the driver and the speed changes from second speed to third speed in the shift map 31, and then, the speed changes from third speed to fourth speed in the shift map 31 at time Tb, which is within a predetermined time interval and during the final control, the shift control means 30 determines that a 2-4 shift should occur at time Tc, which is during completion control after the passage of a predetermined time interval from the time Tb.

Figure 6:
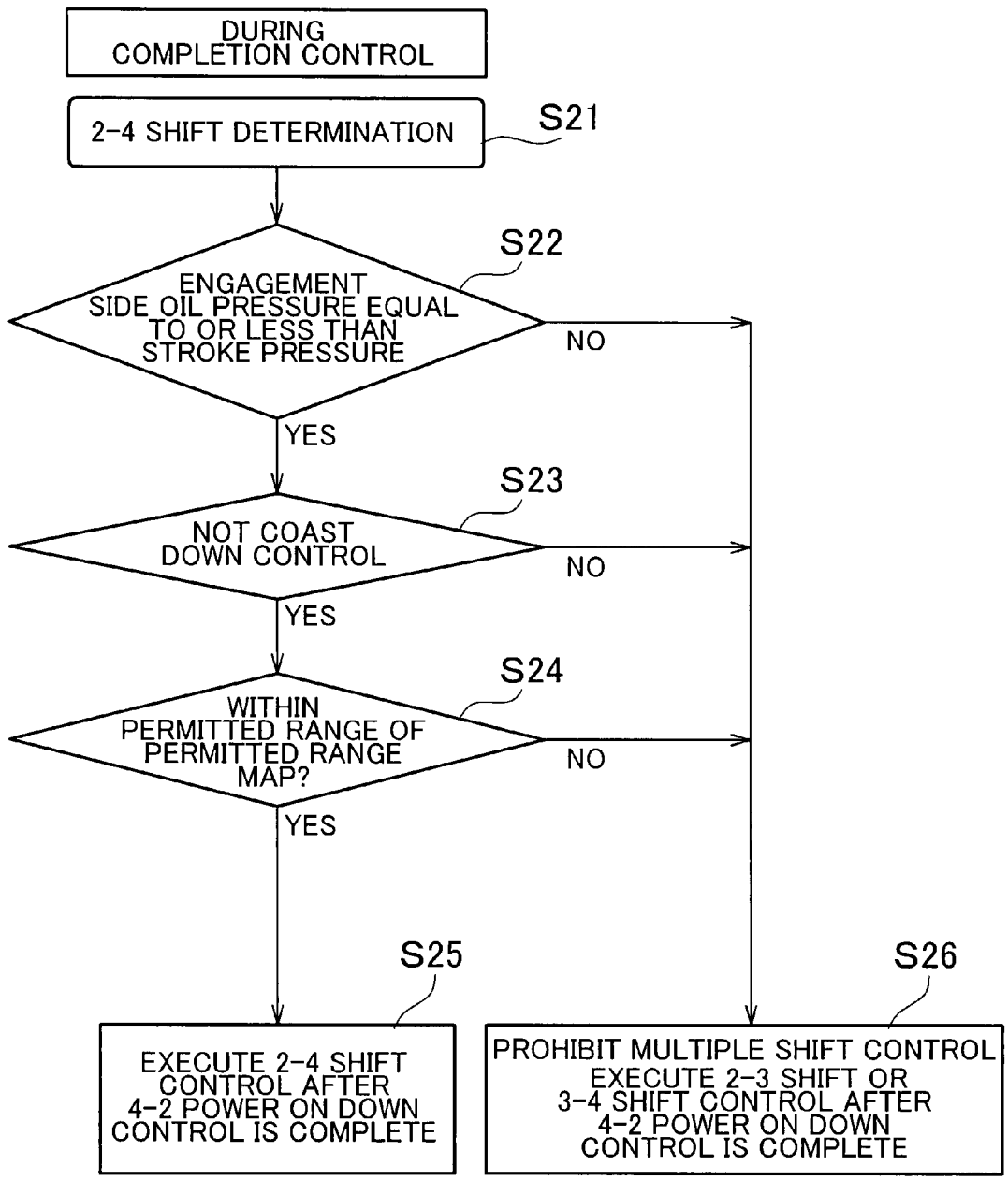
FIG. 6 is a flowchart that shows the control when it has been determined that a 2-4 shift has occurred during completion control.

Thereby, the control unit U starts the control that is shown in FIG. 6 (S21). First, based on the oil pressure command value by the shift control means 30, the control unit U determines whether or not the oil pressure (engagement side oil pressure) of the clutch C3, which is on the engagement side in a 2-4 shift, is equal to or less than the stroke pressure that causes the piston (S22) to stroke. Here, if the oil pressure of the clutch C3, which is on the release side in a 4-2 shift should not be equal to or less than the stroke pressure, when the 2-4 shift is carried out in succession immediately after the completion of the completion control, the processing proceeds to step S26, which will be described below, because there is a concern that the clutch C3 will rapidly engage.

Normally, during completion control, because the oil pressure of the clutch C3 is equal to or less than the stroke pressure (Yes in S22), the processing proceeds to step S23, and it is determined whether or not the 4-2 shift control that is currently being carried out is coast down control (not due to the acceleration being on, that is, it is power-off downshift control). In the case in which this 4-2 shift control is a coast down control (No in S23), as described above, there are, for example, the case of a manual operation of the shift lever by the driver and the case of a rapid speed decrease due to the application of the foot brake. Because this is a case in which the engine rotation speed Ne is increased due to dragging caused by the slipping of the brake B5, and not due to a rise of the engine rotation speed Ne due to turning the power on, it is anticipated that a large load is already being generated in the brake B5, and thus the processing proceeds to step S26, which is described below.

As described above, here, because the 4-2 shift is a power-on downshift and not a coast down control (Yes in S13), the processing proceeds to step S24, and the load amount determining means 35 determines whether or not the load amount is within the permitted range of the permitted range map 36. The example that is shown in FIG. 8A is a case in which, for example, the engine output torque Te, the vehicle speed V, the shift progress degree α, and the like, are within the permitted range of the permitted range map 36 (refer to FIG. 4), the load amount determining means 35 determines that the load amount applied to the clutch C3 and the brake B5 is within the permitted range (Yes in S24), and the processing proceeds to step S25. Thereby, similarly, based on the result of the determination of the load amount determining means 35, the multiple control permitting means 37 permits the multiple shift control 32 for reverse jump shifting by the shift control means 30, and the shift control means 30 that has received this permission executes the multiple shift control 32 for reverse jump shifting.

However, in the case in which the it is determined that a 2-4 shift has occurred during the completion control that is shown in FIG. 8A, because this occurs while the oil pressure of clutch C3 is already substantially nil and the oil pressure of the brake B5 has risen to a complete engagement pressure, if the control immediately proceeds to 2-4 shift control, it is difficult to control the reduction in the play of the clutch C3 and the standby pressure of the brake B5 before releasing correctly. In contrast, the 4-2 shift control occurs during the completion control, and the 4-2 shift is completed a short time thereafter. Thus, in the case in which it is determined that a 2-4 shift has occurred during completion control, the 4-2 shift control is not suspended, and the control proceeds in succession to the 2-4 shift control after the 4-2 shift control has completed.

Specifically, at time t7, when the 4-2 shift control is complete, the shift control means 30 starts proceeding in succession to the 2-4 shift control after setting the shift command to fourth speed at time t7. In addition, by time Td, the reduction in the play of the clutch C3 and the lowering of the oil pressure of the brake B5 to the standby pressure have been carried out. Subsequently, similar to the control in FIG. 7A described above, the inertia phase control for the 2-4 shift control is carried out. At time Te, the completion control is carried out when the rotation change of the input rotation speed Nin has substantially ceased, and furthermore, completion control is carried out from time Tf. At time Tg, the 2-4 shift control has completed.

In contrast, similar to FIG. 8A, FIG. 8B shows the case in which it is determined that a 2-4 shift should occur during the completion control for 4-2 shift control. Specifically, in this case, for example, at time Th, the accelerator pedal is released by the driver, and the speed changes from second speed to third speed in the shift map 31. Then, at time Ti, the speed changes from third speed to fourth speed, and at time Tj during the completion control, the shift control means 30 determines that a 2-4 shift should occur.

In the case that is shown in FIG. 8B, for example, the engine output torque Te and the vehicle speed V are large, that is, either the torque that is acting when the clutch C3 and the brake B5 are slipping is large or the amount of slipping is large (the amount that absorbs the rotation speed differences between the input rotation speed changes before and after shifting), and thus in step S24 in FIG. 6, the load amount determining means 35 determines that the load amount is not within the permitted range based on the permitted range map 36 (No in S24), and the processing proceeds to step S26.

Thereby, based on the result of the determination of the load amount determining means 35, the multiple control permitting means 37 does not permit the multiple shift control 32 for reverse jump shifting by the shift control means 30, and the shift control means 30 that has received this denial starts the reverse jump shift bypass control 34. Thereby, the shift control means 30 does not execute the 2-4 shift control in succession after the 4-2 shift control has completed, and the 2-3 shift control is started from time t7.

Thereafter, similar to the case that is shown in FIG. 7B, during the initial control, the oil pressure of the brake B5 is lowered one-stage, the play is reduced by increasing the oil pressure of the brake B4, and at time Tk, the control proceeds to the inertia phase control. At this time as well, similar to the above, because this is a power-off upshift in which the accelerator pedal has been released, only the engine rotation speed Ne is lowered by releasing the brake B5, and the brake B4 is engaged while slipping in line with this lowering of the engine rotation speed Ne. Thus, even if the brake B5 is slipping slightly, a large load (heat generation) will not be generated at the brake B5. In addition, at time Tl, when the inertia phase control has ended, the control proceeds to the final control, then at time Tm, the control proceeds to the completion control, and at time Tn, the 2-3 shift control is complete.

Next, the shift control means 30 carries out initial control after starting the 3-4 shift control from the time Tn, then proceeds to the inertial phase control at time To, releases the brake B4, and similarly engages the clutch C3 while carrying out feedback control. At this time as well, similar to above, the engine rotation speed Ne is lowered by releasing the brake B4, and the clutch C3 is engaged while slipping in line with the lowering of the engine rotation speed Ne. However, because there is an interval equivalent to the time from the completion of the 4-2 shift control (time t7) to the 2-3 shift (time t7 to Tn), the clutch C3 cools during this interval, and thus a load (heat generation) is not continuously produced on the clutch C3. In addition, because the slipping time of the clutch C3 is appreciably shortened in comparison to the case in which, for example, the 2-4 shift is carried out, the load (heat generation) of the clutch C3 is appreciably reduced by an equivalent amount.

In addition, at time Tp, when the inertia phase has ended, the control proceeds to the final control, then at time Tq, the control proceeds to the completion control, and at time Tr, the 3-4 shift control is complete. Thereby, the 2-3-4 shift is complete and the shift to fourth speed is completed depending on the release of the accelerator pedal, and thus the reverse jump shift bypass control 34 is also completed.

According to the shift control apparatus 1 for an automatic transmission according to the present invention as explained above, in the case in which the load amount that is applied to the friction engagement elements carrying out clutching during jump shifting is within the permitted range A, the multiple shift control 32 for reverse jump shifting is permitted, there is no adverse influence on the durability of the friction engagement elements because this shifting is carried out, and it is possible to improve the drivability. In addition, in the case in which the load amount is outside the permitted range A, the multiple shift control 32 for reverse jump shifting is not permitted, that is, the multiple shift control 32 is not carried out, and thus, it is possible to prevent the amount of heat generation in the friction engagement elements from becoming large, and it is possible to prevent thereby any adverse influence on the durability.

In addition, when multiple shift control is not permitted by the multiple control permitting means 37, the shift control means 30 carries out shift control that shifts to the shift speed (for example, the fourth speed) that is to be shifted to by the reverse jump shift after shifting, after carrying out shift control that shifts to an intermediate speed (for example, the third speed) of the shift speed that is to be shifted to by the reverse jump shift (for example, a 2-4 shift) before and after shifting. Thus, the shift speed can be shifted to the shift speed (for example, the fourth speed) that is to be shifted to by the reverse jump shift after passing through the clutch shifting of a friction engagement element (for example, from the brake B5 to the brake B4) that is different from the friction engagement element that is carrying out the clutching by jump shifting (for example, from the clutch C3 to the brake B5). Thereby, the same friction engagement elements does not slip continuously over an extended time period in comparison to the case in which reverse jump shifting is carried out, it is possible to prevent the amount of heat generation that is generated in each of the friction engagement elements from becoming large, and it is possible to prevent any adverse effects on the durability of the friction engagement elements. In addition, in comparison to the case in which a cooling interval is provided without shifting as-is after carrying out a jump shift, it is possible to lessen the sense of dragging and the sense of delay by shifting to the intermediate speed and it is possible to prevent deterioration in drivability.

Here, in the case in which the reverse jump shifting is a shift that is equal to or greater than three stages (for example, a 5-2 shift or the like), it is possible to consider the shift control means 30 selecting the shift speed (for example, the fourth speed) that is a one-stage shift from the shift speed (for example, the fifth speed) that is to be shifted to by the reverse jump shift after shifting as an intermediate speed, that is, passing through the shift speed having the gear change ratio that is closest to the shift speed that is so be shifted to. Thereby, it is possible to lessen the sense of dragging and the sense of delay, and it is possible to prevent a deterioration in the drivability.

In addition, the load amount determining means 35 can determine whether or not the load amount that is applied to the friction engagement elements is within the permitted range A according to the size of the torque that is acting on the friction engagement elements that are slipping by determining that the load amount is within a permitted range based on the engine output torque Te that is input to the automatic speed change mechanism 5.

In addition, the load amount determining means 35 can determine whether or not the load amount that is applied to the friction engagement elements is within a permitted range according to the amount of the slipping of the friction engagement elements (the amount of the rotation speed difference that is absorbed by slipping) that is applied during jump shifting by determining that the load amount is within a permitted range based on the differences in the rotation speeds of the input shaft 9a of the automatic speed change mechanism 5, specifically, the vehicle speed V, before and after jump shifting.

In addition, the load amount determining means 35 can determine whether or not the load amount that is being applied to the friction engagement elements is within a permitted range according to the amount of slipping that has already been produced in the friction engagement elements (the rotation speed differences that are absorbed by the slipping), and in particular, to the length of the time that the friction engagement elements have been slipping by determining that the load amount is within a permitted range based on the shift progress rate $\alpha$.

Specifically, the load amount determining means 35 has the permitted range map 36 that records the data for the permitted range in advance, and can determine instantaneously whether or not the load amount is within the permitted range A depending on the permitted range map 36 that has been calculated in advance by taking into consideration, for example, the durability of the friction engagement elements by determining that the load amount is within the permitted range A by referring to the permitted range map 36.

Note that in the present exemplary embodiment that has been explained above, an automatic transmission to which the present invention can be applied was explained that attains an advantageous five forward speeds and one reverse speed by using an FF type vehicle. However, this is not limiting, and an exemplary embodiment of the present invention can be applied to an advantageous automatic transmission that is used in an FR type or another type of vehicle, and with respect to the number of shift speeds as well, the present invention can be applied to a stepped automatic transmission that has a number of stages that allows jump shifting.

In addition, in the present exemplary embodiment, in particular a multiple shift control was explained that carries out the next shift control in succession to the previous shifting (refer to FIG. 8), but if the determination of the next shifting is carried out during the previous shift control, multiple shift control that starts the next shift control after an interval that is of a degree that does not negatively affect drivability also carries out the next shifting in succession.

Furthermore, in the present exemplary embodiment, an example was explained in which the determination of jump shifting and reverse jump shifting are carried out based on a shift map. However, this is not limiting, and, for example, jump shifting or reverse jump shifting may be determined by using, for example, the manual operation by a shift lever by the driver. As an example of such a case, it is possible to consider the case in which, for example, a manual shift change is made from the fourth speed to the second speed while the accelerator pedal is depressed a certain degree, and then immediately returned to the fourth speed.

What is claimed is:

1. A shift control apparatus, for an automatic transmission, that is used in a stepped automatic transmission that has a plurality of friction engagement elements that attain power transmission paths in a shift gear train mechanism by engagement states and in which a shift is carried out by clutching between friction engagement elements, and jump shift control is executed that performs a jump shift to a shift speed that is separated by two or more stages by one clutch action, the shift control apparatus comprising:

a shift control means that, when it is determined that a next shift should occur during control for a former shift, executes multiple shift control in which the control for the former shift is suspended or control for the next shift is carried out in succession;

load amount determining means that determines that a load amount applied to the friction engagement elements is within a permitted range when a reverse jump shift, that returns to a shift speed before the jump shift, has occurred during control of the jump shift; and multiple control permitting means that permits execution of multiple shift control for the reverse jump shift based on a determination of the load amount determining means; wherein, the shift control means executes the multiple shift control for the reverse jump shift when permitted by the multiple control permitting means when it is determined that the reverse jump shift should occur during the control of the jump shift;

wherein the load amount determining means determines that the load amount is within the permitted range based on a shift progress rate.

2. The shift control apparatus, for an automatic transmission, according to claim 1, wherein the load amount determining means determines that the load amount is within the permitted range based on rotation speed differences of an input shaft of the shift gear train mechanism before and after the jump shift.

3. The shift control apparatus, for an automatic transmission, according to claim 1, wherein, the shift control means carries out shift control in which the shift speed is shifted to an intermediate speed of the shift speed to be shifted to by the reverse jump shift when the multiple control permitting means does not permit the multiple shift control.

4. The shift control apparatus, for an automatic transmission, according to claim 3, wherein the shift control means selects a shift speed that is one shift stage from the shift speed that is to be shifted to by the reverse jump shift after shifting as the intermediate speed in the case in which the reverse jump shift is a shift that is three or more stages.

5. The shift control apparatus, for an automatic transmission, according to claim 1, wherein the load amount determining means determines that the load amount is within the permitted range based on an input torque that is input into the shift gear train mechanism.

6. The shift control apparatus, for an automatic transmission, according to claim 5, wherein the load amount determining means has a permitted range map that records data for a permitted range map in advance and determines that the load amount is within a permitted range by referring to the permitted range map.

* * * * *